United States Patent
Forster (10) Patent No.: US 12,288,111 B2
(45) Date of Patent: Apr. 29, 2025

(54) RFID TAG ANTENNAS WITH MULTIPLE CONDUCTORS

(71) Applicant: Avery Dennison Retail Information Services LLC, Mentor, OH (US)

(72) Inventor: Ian J. Forster, Chelmsford (GB)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 17/758,100

(22) PCT Filed: Dec. 28, 2020

(86) PCT No.: PCT/US2020/067164
§ 371 (c)(1),
(2) Date: Jun. 28, 2022

(87) PCT Pub. No.: WO2021/138261
PCT Pub. Date: Jul. 8, 2021

(65) Prior Publication Data
US 2023/0051141 A1    Feb. 16, 2023

Related U.S. Application Data

(60) Provisional application No. 62/954,965, filed on Dec. 30, 2019.

(51) Int. Cl.
*G06K 19/02* (2006.01)
*G06K 19/077* (2006.01)

(52) U.S. Cl.
CPC ..... *G06K 19/027* (2013.01); *G06K 19/07756* (2013.01)

(58) Field of Classification Search
CPC ........... G06K 19/027; G06K 19/07756; G06K 19/0724; G06K 19/07754; H01Q 1/2225;
(Continued)

(56) References Cited

U.S. PATENT DOCUMENTS

| 7,057,562 B2 | 6/2006 | Forster et al. |
| 7,397,378 B1 | 7/2008 | Leason |

(Continued)

FOREIGN PATENT DOCUMENTS

| CN | 1816818 | 8/2006 | |
| EP | 3532995 B1 * | 12/2021 | ............ G06K 19/07 |

(Continued)

OTHER PUBLICATIONS

International Preliminary Report on Patentability dated Jul. 5, 2022 issued in corresponding IA No. PCT/US2020/067164 filed Dec. 28, 2020.

(Continued)

*Primary Examiner* — Thien M Le
*Assistant Examiner* — Asifa Habib (57) ABSTRACT

In one embodiment, an RFID device is disclosed that contains a first conductive structure and a second conductive structure formed from multiple conductive materials configured to move between a first operating condition and a second operating condition when exposed to an event or other stimuli. The second conductive structure is initially operatively coupled to the first conductive structure in the first operating condition. However, after exposure to the event, the first conductive structure is altered to change the behavior of the RFID device. The RFID device is attachable to a substrate, such as a garment or a fabric, and the event may be a single or multiple occurrence event, such as washing, stretching, heating, or exposure of the RFID device to electrical signals.

17 Claims, 12 Drawing Sheets

(58) Field of Classification Search
CPC ............ H01Q 1/38; H01Q 5/378; H01Q 7/00; H01Q 9/065; H01Q 9/26
See application file for complete search history.

(56) References Cited

U.S. PATENT DOCUMENTS

| | | | |
|---|---|---|---|
| 8,242,911 | B2 | 8/2012 | Moore et al. |
| 8,933,789 | B1 | 1/2015 | Fink et al. |
| 8,970,378 | B2 | 3/2015 | Deavours et al. |
| 11,602,465 | B1* | 3/2023 | Parvarandeh ........ G01N 27/048 |
| 2005/0012616 | A1* | 1/2005 | Forster ................. G06K 19/073 |
| | | | 340/572.7 |
| 2008/0150693 | A1 | 6/2008 | You et al. |
| 2009/0121872 | A1* | 5/2009 | Lynch ................. G06K 7/0008 |
| | | | 340/572.1 |
| 2009/0295645 | A1 | 12/2009 | Campero et al. |
| 2012/0038461 | A1* | 2/2012 | Forster ............. G06K 19/07749 |
| | | | 235/492 |
| 2014/0263659 | A1* | 9/2014 | Kervinen ......... G06K 19/07381 |
| | | | 235/488 |
| 2015/0324681 | A1 | 11/2015 | Mats et al. |
| 2016/0328584 | A1* | 11/2016 | Rokhsaz ............. G06K 7/10326 |
| 2018/0157955 | A1 | 6/2018 | Forster |
| 2018/0247727 | A1* | 8/2018 | Ronay ...................... H01Q 1/38 |
| 2019/0197380 | A1 | 6/2019 | Blank |
| 2019/0325285 | A1 | 10/2019 | Forster et al. |
| 2021/0117743 | A1* | 4/2021 | Pueschner ........ G06K 19/07775 |
| 2021/0158115 | A1* | 5/2021 | Chandramowle ........ H01Q 1/42 |
| 2021/0383725 | A1* | 12/2021 | Dehmubed ........... G09F 3/0292 |
| 2023/0335881 | A1* | 10/2023 | Hirata ...................... H01Q 7/00 |
| 2024/0360702 | A1* | 10/2024 | Trivelpiece ........... G09F 3/0288 |

FOREIGN PATENT DOCUMENTS

| | | |
|---|---|---|
| JP | 2007-529049 | 10/2007 |
| WO | 2005/008575 | 1/2005 |

OTHER PUBLICATIONS

International Search Report and Written Opinion dated Apr. 9, 2021 issued in corresponding IA No. PCT/US2020/067164 filed Dec. 28, 2020.

* cited by examiner

RFID TAG ANTENNAS WITH MULTIPLE CONDUCTORS

CROSS-REFERENCE TO RELATED APPLICATION

The present application is a 371 of International Application No. PCT/US2020/067164, which was published in English on Jul. 8, 2021, and claims the benefit of U.S. Provisional Patent Application No. 62/954,965 filed Dec. 30, 2019, both of which are incorporated herein by reference in their entireties.

FIELD

The present invention relates generally to radio-frequency identification (RFID) devices having multiple conductors, and their methods of manufacture. More specifically, the multiple antennas can vary in composition and/or structure to change the performance of the RFID devices in response to externally applied events. Accordingly, the present specification makes specific reference thereto. However, it is to be appreciated that aspects of the present invention are also equally amenable to other like applications, devices and methods of manufacture.

BACKGROUND

Generally stated, RFID is the use of electromagnetic energy to stimulate a responsive device (known as an RFID "tag" or transponder) to identify itself and, in some cases, provide additional information and/or data stored in the tag. RFID tags and/or labels typically contain a combination of antennas and analog and/or digital electronics, which may include, for example, a semiconductor device commonly referred to as the "chip", communications electronics, data memory, and control logic. Typical RFID tags have a microprocessor electrically connected to an antenna, and act as transponders, providing information stored in the chip memory in response to a radio frequency interrogation signal received from a reader, also referred to as an interrogator. The reader/interrogator, in turn, converts the radio waves from the RFID device into a form that can be utilized by a computer. In the case of passive RFID devices, the energy of the interrogation signal also provides the necessary energy to operate the RFID tag device.

RFID tags may be incorporated into or attached to any object or articles that a user wishes to later identify and/or track, such as products, equipment, individuals, vehicles, machinery, livestock, etc. In some cases, the RFID tag may be attached to the outside of the article with a clip, adhesive, tape, or other means and, in other cases, the RFID tag may be inserted within the article, such as being included in the packaging, or located within the container of the article or plurality of articles.

RFID tags are typically manufactured with a unique identification number which is usually a simple serial number of a few bytes with a check digit attached. This identification number is typically incorporated into the RFID tag during its manufacture. The user cannot alter this serial/identification number, and manufacturers guarantee that each RFID tag serial number is used only once and is, therefore, unique. Such read-only RFID tags typically are permanently attached to an article to be identified and/or tracked and, once attached, the serial number of the tag is associated with its host article in a computer database. When used to track or manage inventory, the microprocessor stores unique identifying data associated with the inventory into the RFID tag, and an operator can use an external receiver/reader to retrieve the stored data and process or track the inventory.

One difficulty associated with the manufacturing of RFID devices is the need to impart some degree of flexibility and durability to the RFID device without damaging the same. Historically, antenna structures used with RFID devices have been formed from a conductive material (e.g., copper, silver, or aluminum) and configured in various constructions, which may be formed by being printed or placed onto an object such as a carrier. Unfortunately, such RFID antenna structures have not, historically, always been particularly flexible or durable when subjected to flex forces. Therefore, it would also be advantageous to provide an RFID antenna structure that is both durable and flexible, and an RFID antenna structure formed from a variety of different conductive materials with more than one conductor construction would also permit the RFID device to perform differently in response to applied external events.

Therefore, there exists in the art a long felt need for an RFID device and RFID antenna that are both relatively flexible and durable when exposed to flex forces. There also exists in the art a long felt need for an RFID device having multiple conductors that allow the RFID device to, either permanently or reversibly, change the performance of the RFID device.

Therefore, the present invention discloses a RFID device having more than one RFID antenna structure that, when combined, enable changes in the performance of the RFID device. More specifically, the RFID device includes a multiple RFID antenna structure containing more than one material and that changes the performance of the RFID device following exposure to an external stimulus or event such as, but not limited to, washing, stretching, heating, or exposure to a received electrical signal.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

RFID devices containing a first conductive structure, a second conductive structure, and a RFID chip operatively coupled to the first conductive structure are described herein. In some embodiments, the first conductive structure is manufactured from a first conductive material and in a first configuration, and the second conductive structure is manufactured from a second conductive material and in a second configuration. In some embodiments, the first conductive structure and the second conductive structure are in conductive communication with one another when the RFID device is in a first operating condition. Alternatively, in some embodiments, the first and second conductive structures may be initially coupled together ohmically or reactively, with or without a mechanical bond.

In some embodiments, when exposed to an external event or stimulus including, but not limited to, washing, stretching, heating, or exposure to a received electrical signal, the conductive communication between the first and second conductive structures is disrupted so that the RFID device is reconfigured to a second operating condition. Depending on the materials used to construct the first and second conductive structures and the nature of the external event or stimulus, the change between the first and second operating conditions may be either permanent or it may be reversible. Additionally, the change of state from the first operating condition to the second operating condition may occur after a single external event or, alternatively, after multiple or a series of events, depending on the construction of the first and second conductive structures and how the conductive structures are attached to a substrate, such as a garment, package or other article.

In yet another embodiment, the RFID device contains a first conductive structure, a second conductive structure and a RFID chip. In some embodiments, the first conductive structure is manufactured from a first conductive material and in a first configuration, and the second conductive structure is preferably manufactured from a second conductive material and in a second configuration. Additionally, in some embodiments, the second conductive structure is non-mechanically coupled to the first conductive structure via, for example, a magnetic field, a capacitive field, or a combination of fields, and both the first and second conductive structures are disposed of on a substrate, such as a wearable item or a fabric.

In some embodiments, the first conductive structure may be substantially circular in configuration when in a first operating condition, but will deform when exposed to an external event or other stimulus so that the RFID device moves from the first operating condition to a second operating condition.

In yet another embodiment, the RFID device comprises a first conductive structure, a second conductive structure and a RFID chip. In some embodiments, the first conductive structure is manufactured in a first structural configuration and the second conductive structure is manufactured in a second structural configuration. Additionally, in some embodiments, the first and second conductive structures are separately attachable to a substrate, wherein the particular mounting environment changes the connection between them so as to respond differently to an external event or stimulus, regardless of whether the first and second conductive structures are manufactured from the same conductive material. For example, and not by way of limitation, when attached to the substrate, the first conductive structure may be elastically encapsulated in the substrate, and the second conductive structure may be rigidly encapsulated or otherwise attached to the substrate. Alternatively, and by way of further example and not limitation, the first and second conductive structures may also be non- encapsulatedly coupled to a common base substrate in such a way so that they each respond differently to the external event or other stimulus.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As noted above, there exists in the art a long felt need for a RFID tag or device that is attachable to a garment, fabric, or wearable article that may be subjected to flex forces and that contains an antenna structure formed from multiple conductive materials and elements in different configurations. More specifically, the RFID device may contain more than one conductive material and/or configuration that can enable changes (either reversible or permanent) in the performance of the RFID device in relation to external events or other stimuli including, without limitation, washing, stretching, etc.

Figure 1:
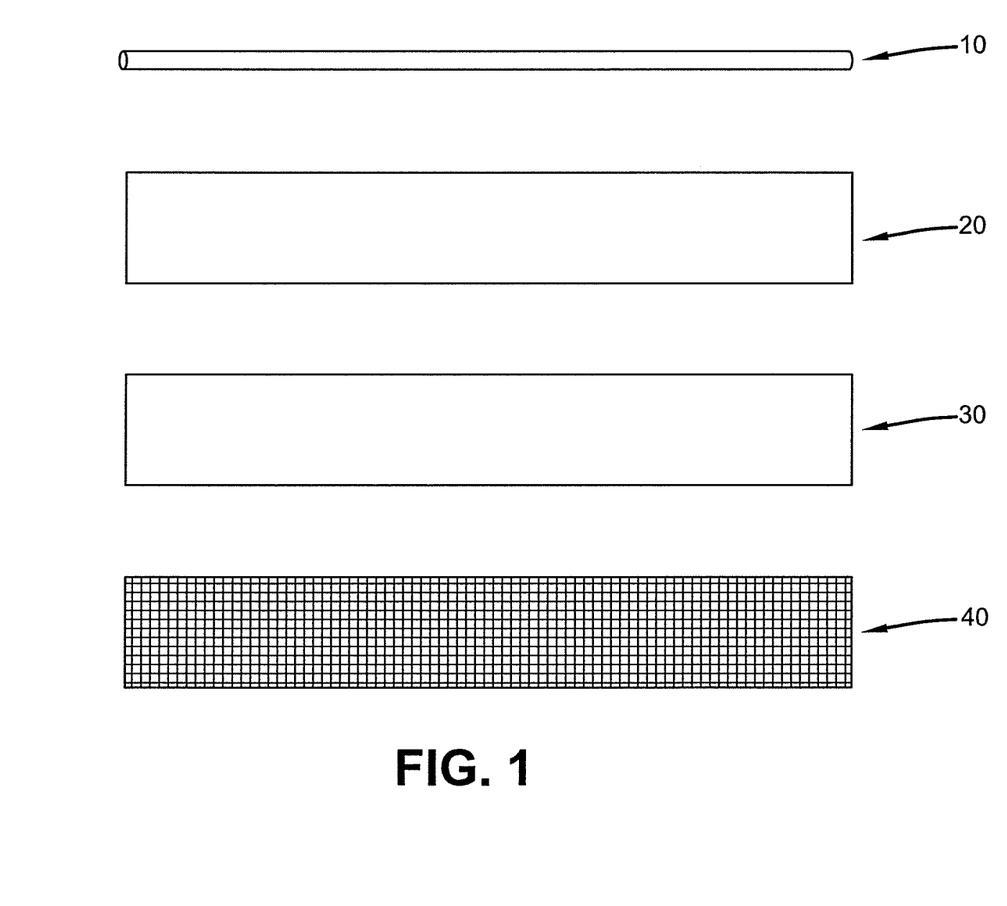
FIG. 1 illustrates a perspective view of a plurality of conductive materials for use with a RFID device in accordance with the disclosed architecture.

Referring initially to the drawings, FIG. 1 illustrates a perspective view of a plurality of conductive materials and potential configurations for use with an RFID device, which may contain, by way of example and not limitation, (a) a wire 10 made of copper, or other conductive material; (b) a conductive foil material 20 that is either cut (e.g., laser or die) or etched, including, but not limited to, aluminum or copper; (c) a printed conductor 30, such as a matrix coating (e.g., inks) of particles of copper, silver, graphene or other inorganic or organic conducting materials or combinations thereof; or (d) a metallic mesh 40. Although the plurality of conductive materials and configurations can singularly adapt somewhat to an event or external stimulus, greater flexibility is provided to an RFID device by using two or more conductors as part of a common antenna structure.

Figure 2:
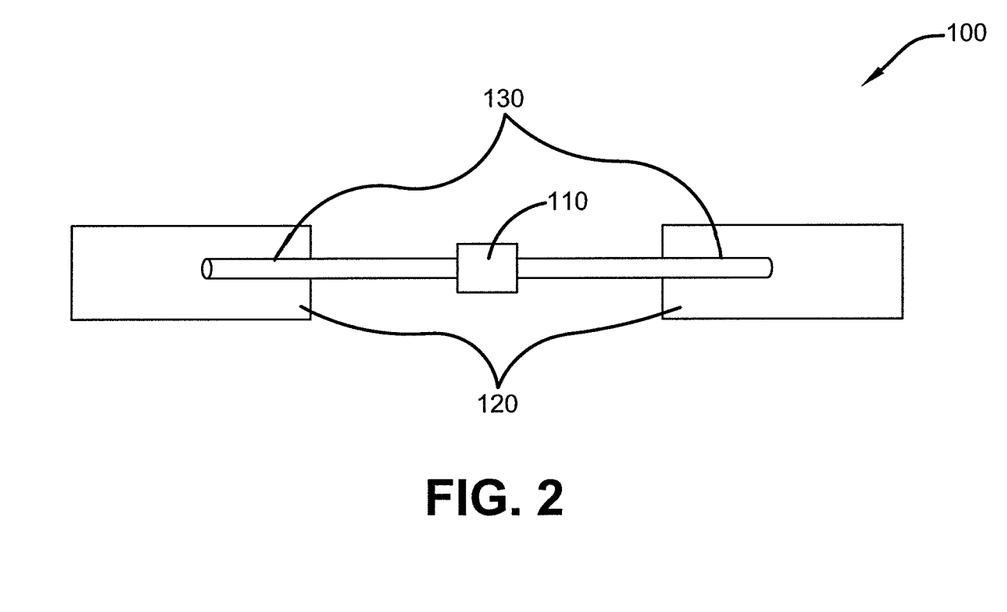
FIG. 2 illustrates a schematic diagram of a RFID device containing a first conductive structure constructed from a first conductive material, a RFID chip, and a second conductive structure constructed from a second conductive material, all in accordance with the disclosed architecture.
Figure 7A:
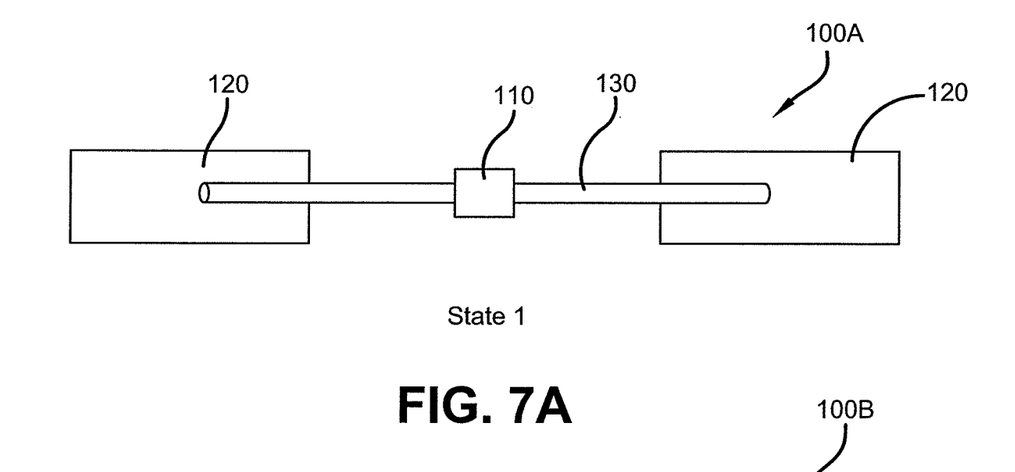
FIG. 7A illustrates a schematic diagram of an RFID device operating in a first operating condition in accordance with the disclosed architecture.

FIG. 2 illustrates a schematic diagram of a RFID device 100 having multiple conductors. More specifically, the RFID device 100 contains an RFID chip 110, a first conductive structure 120, and a second conductive structure 130. The second conductive structure 130 is operatively coupled to the first conductive structure 120 when in a first operating condition 100A, as best illustrated in FIG. 7A, and the RFID chip 110 is operatively coupled to the second conductive structure 130. The initial coupling between the first conductive structure 120 and the second conductive structure 130 can vary. In some embodiments, the initial coupling between the first conductive structure 120 and the second conductive structure 130 is conductive coupling.

In some embodiments, the first conductive structure 120 is manufactured from a first conductive material, and the second conductive structure 130 is manufactured from a different conductive material. Additionally, in some embodiments, the first conductive structure 120 is constructed in a first configuration, and the second conductive structure 130 is preferably constructed in a different configuration. For example, the first conductive structure 120 may be a pair of printed areas of conductive ink, such as the printed conductor 30 of FIG. 1, and the second conductive structure 130 may be a wire 10 (as also shown in FIG. 1). Further, the wire of the second conductive structure 130 is conductively coupled to the pair of printed areas of the first conductive structure 120, as the wire overlaps a part of the pair of printed areas of conductive ink. Alternatively, in some embodiments, the coupling may be via capacitance.

Figure 3:
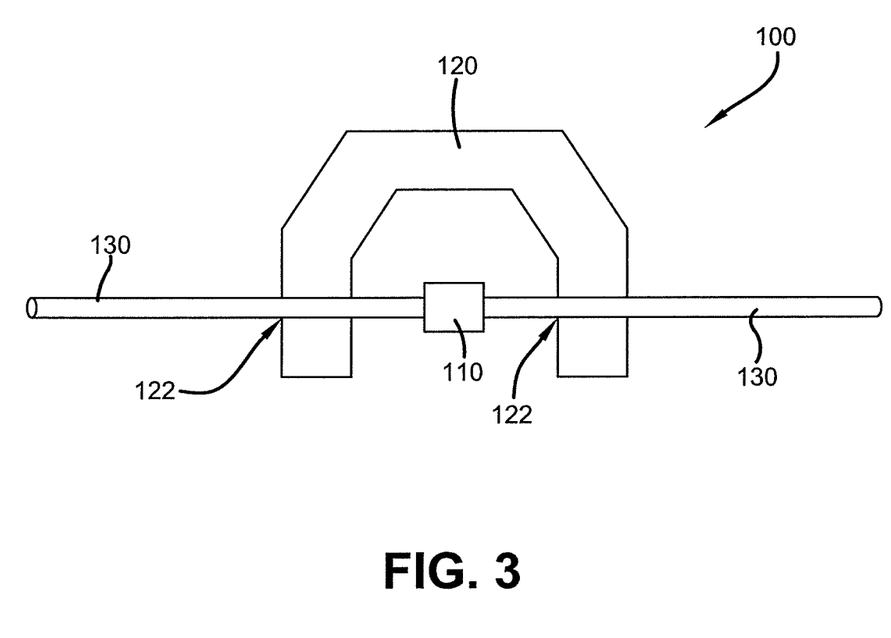
FIG. 3 illustrates a schematic diagram of an RFID device containing a first conductive structure, a RFID chip, and a second conductive structure, wherein the first conductive structure contains a shunt for initially connecting the first and second conductive structures in accordance with the disclosed architecture.

FIG. 3 illustrates a schematic diagram of an RFID device 100 containing a RFID chip 110, a first conductive structure 120, and a second conductive structure 130, wherein the first conductive structure 120 further contains a shunt element 122 for initially connecting the first conductive structure 120 to the second conductive structure 130. More specifically, the shunt element 122 of the first conductive structure 120 overlaps portions of the second conductive structure 130 when the RFID device 100 is in a first operating condition.

In both the configurations of FIGS. 2 and 3, the first conductor 120 and the second conductor 130 may have differing responses to an external event due to being manufactured from different materials and/or different configurations. For example, exposure to the external event (or a series of external events) will cause the RFID device 100 to change from the first operating condition to a second operating condition. The change in operating conditions may be permanent or reversible depending on the materials used to construct each of the conductive structures, the configurations of the conductive structures, the type of external event, the number of external events, and/or combinations thereof.

As stated above, the external event may be a single event or a series of events including, without limitation, washing, stretching, heating, receiving an electrical signal, etc. For example, if the first conductive structure 120 is water soluble, such as a conductive ink with a water-soluble binder, the conductive ink could be removed by a washing event, thereby changing the characteristics of the RFID device 100. More specifically, as the first conductive structure 120 is washed away and removed (or partially removed), the performance of the RFID device 100 is altered, either reversibly or permanently.

Figure 4:
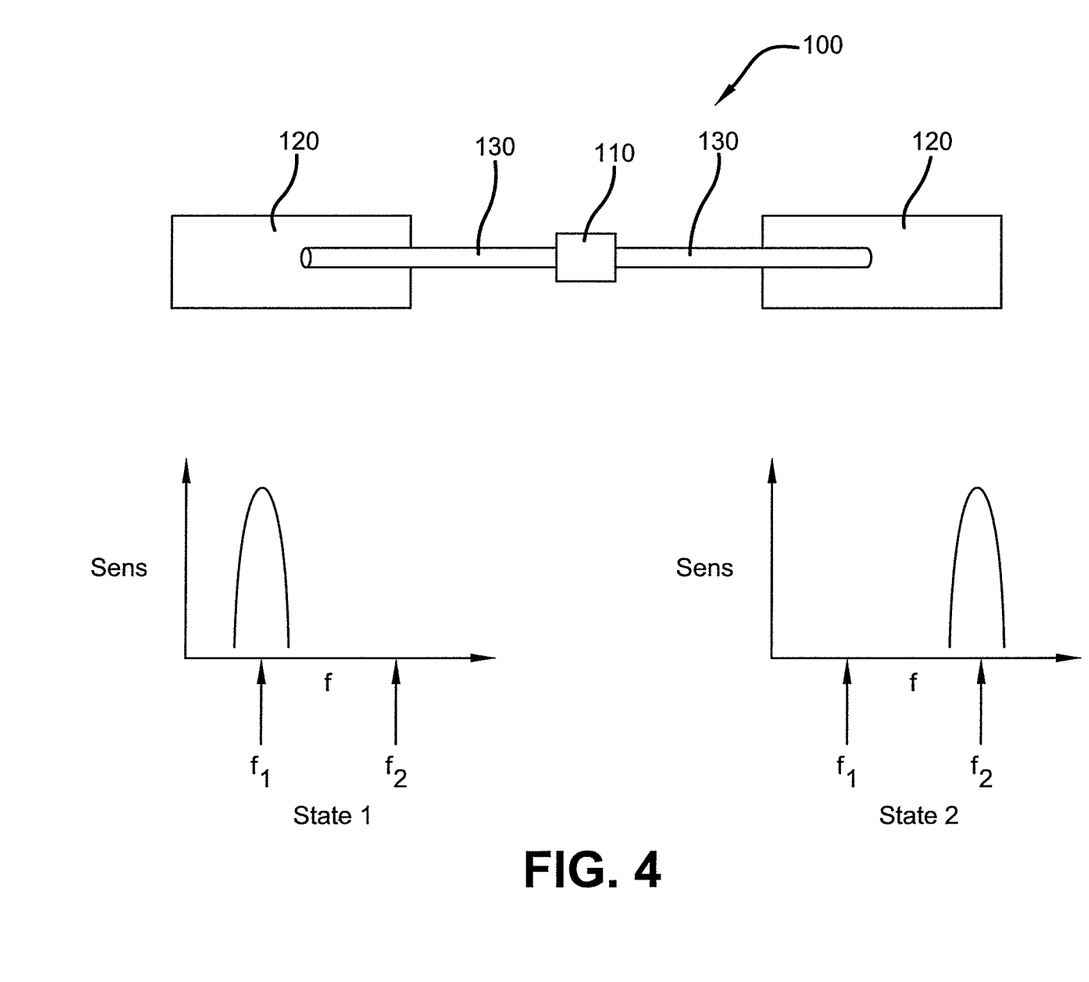
FIG. 4 illustrates a schematic diagram of the RFID device containing a first conductive structure having a first operating condition, a RFID chip, and a second conductive structure having a second operating condition, all in accordance with the disclosed architecture.

FIG. 4 illustrates a schematic diagram of the RFID device 100 containing a RFID chip 110, a first conductive structure 120 having a first operating condition, and a second conductive structure 130 having a second operating condition, and the ability to experience a change in its performance in response to the removal of the first conductive structure 120. Before removing the first conductive structure 120, the entire antenna configuration of the first conductive structure 120 and the second conductive structure 130 is longer. Stated differently, the first conductive structure 120 and the second conductive structure 130 function as a series RFID antenna with two tuning states based on the properties of the first and second conductive structures 120, 130. As such, the RFID device 100 functions in the first operating condition (100A of FIG. 7A) with a frequency of f1, for example, in the region of 902 MHz to 928 MHz. When the first conductive structure 120 is removed, the entire antenna configuration is shortened, so the optimum frequency moves up to f2 in the second operating condition (100B of FIG. 7B). The f2 frequency may be a band where RFID systems do not operate, so the effect of the change would be either to prevent or reduce the range of operation in the 902-928 MHz band.

Figure 5A:
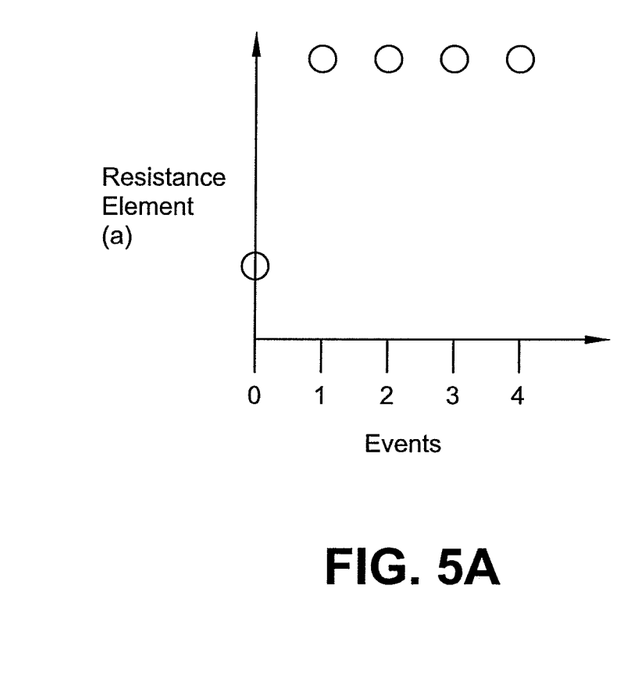
FIG. 5A illustrates a graphical representation of a first conductive structure of an RFID device having a resistance that is altered following exposure of the first conductive structure of the RFID device to a plurality of repeated external events in accordance with the disclosed architecture.
Figure 5B:
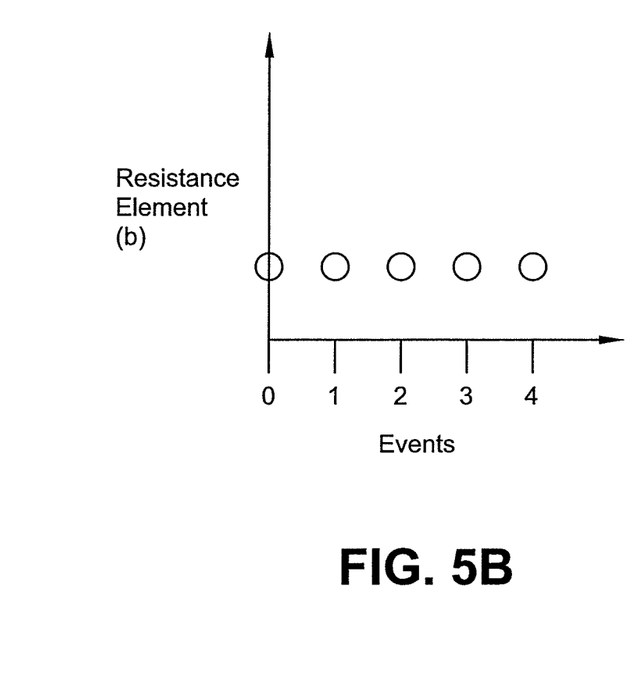
FIG. 5B illustrates a graphical representation of a second conductive structure of an RFID device having a resistance that is unaltered following exposure to the plurality of repeated external events in accordance with the disclosed architecture.

FIG. 5A illustrates a graphical representation of a first conductive structure of an RFID device having a resistance that is altered following exposure of the first conductive structure of the RFID device to a plurality of repeated external events, and FIG. 5B illustrates a graphical representation of a second conductive structure of an RFID device having a resistance that is unaltered following exposure to the same plurality of repeated external events. More specifically, FIGS. 5A and 5B illustrate a visualization of how a key operating parameter, such as a resistance of the first conductive structure 120 material, may change with exposure to an external event compared to a resistance of the second conductive structure 130 material. In this particular example, a single event, such as washing the RFID device 100, may cause the first conductive structure 120 to move from a low resistance to a higher resistance (as shown in FIG. 5A), wherein the second conductive structure 130 remains relatively unaffected after exposure to the first event (as shown in FIG. 5B). As best shown in FIGS. 5A and 5B, following the first event, the resistance remains relatively the same with repeated events, such as further washing cycles.

Figure 6A:
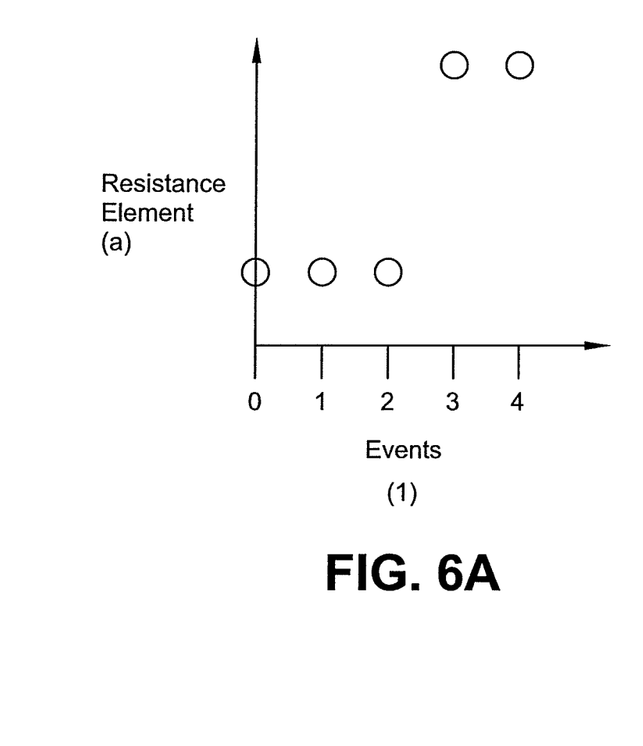
FIG. 6A illustrates an alternative graphical representation of the resistance of the first conductive structure of the RFID device being altered following exposure to the plurality of repeated events in accordance with the disclosed architecture.
Figure 6B:
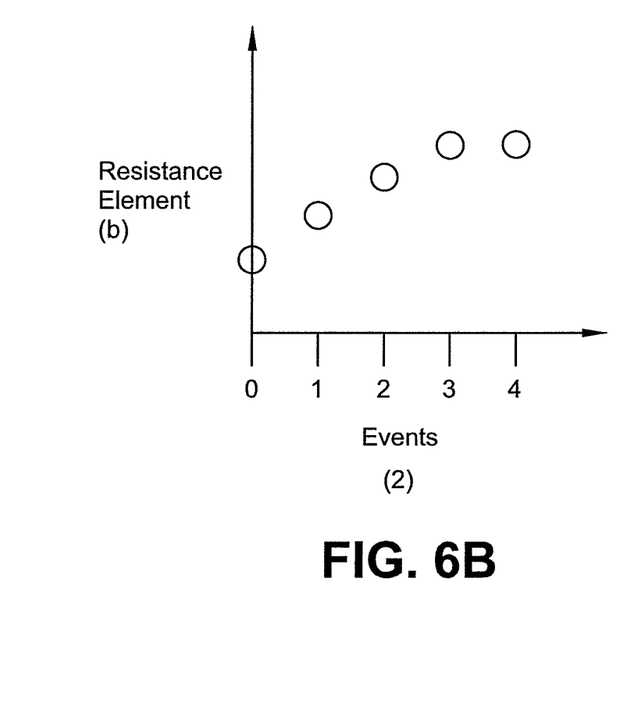
FIG. 6B illustrates an alternative graphical representation of the resistance of the second conductive structure of the RFID device being altered following exposure to the plurality of repeated events in accordance with the disclosed architecture.

FIG. 6A illustrates an alternative graphical representation of the resistance of the first conductive structure of the RFID device being altered following exposure to a plurality of repeated events, and FIG. 6B illustrates an alternative graphical representation of the resistance of the second conductive structure of the RFID device being altered following exposure to the same plurality of repeated events. More specifically, FIGS. 6A and 6B illustrate alternative changes in resistance patterns for the first conductive structure 120 material and the second conductive structure 130 material in response to a plurality of same or similar events, such as multiple washing cycles. In this particular example and as best illustrated in FIG. 6A, a resistance of the first conductive structure 120 material remains relatively low after exposure to the first two events, and then increases with the third event and levels off thereafter with the fourth event. By comparison and as best illustrated in FIG. 6B, the resistance of the second conductive structure 130 increases gradually throughout the first three events and then levels off with the passage of the fourth event.

Figure 7B:
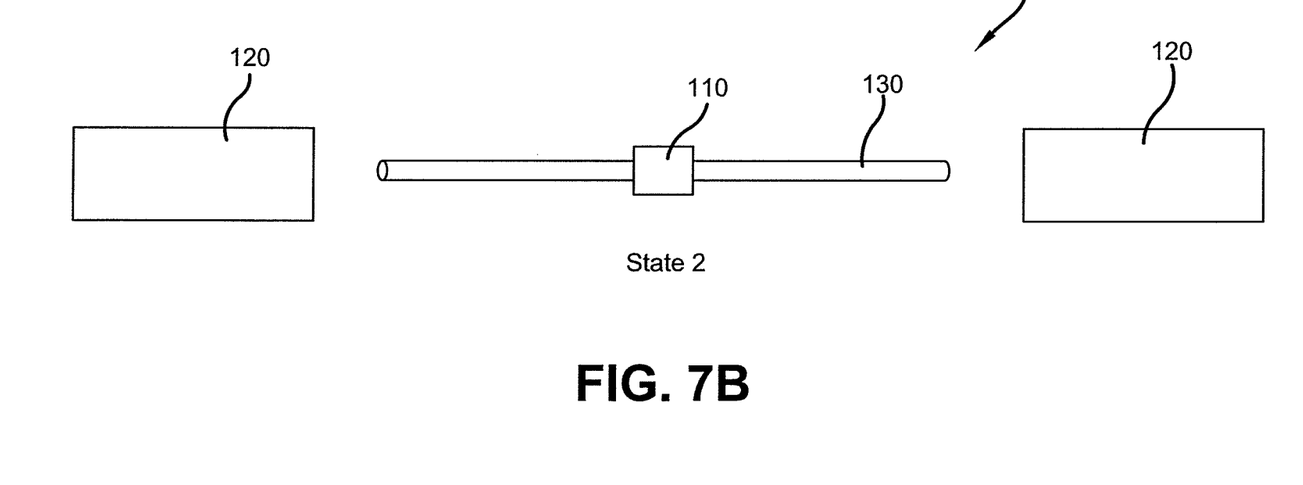
FIG. 7B illustrates a schematic diagram of an RFID device operating in a second operating condition in accordance with the disclosed architecture.

FIG. 7A illustrates a schematic diagram of an RFID device 100 operating in a first operating condition 100A, and FIG. 7B illustrates a schematic diagram of the RFID device 100 operating in a second operating condition 100B. More specifically, FIGS. 7A and 7B illustrate how the first conductive structure 120 and the second conductive structure 130, containing different materials and configurations, may be used to change a behavior or the performance of the RFID device 100 in response to an external event. In this particular case, the second conductive structure 130 (illustrated as a wire antenna) is initially in contact with the first conductive structure 120 (illustrated as a pair of printed conductors). For example, the second conductive structure 130 may be sewn into a substrate, such as a fabric, whereas the first conductive structure 120 may be attached to a surface of the substrate.

When the RFID device is in the first operating condition 100A, the first conductive structure 120 and the second conductive structure 130 are coupled together, ohmically or reactively. In addition, the first conductive structure 120 and the second conductive structure 130 may be coupled with a mechanical bond. If the fabric is part of a garment that stretches when worn, the RFID device is in the first operating condition 100A while the garment is hanging, for example, in a store. When in the first operating condition 100A, the frequency (as best illustrated in FIG. 4A) will want to be tuned for maximum range in the relatively light dielectric loading environment of the RFID device.

Additionally, when the external event is a stretching of the garment bearing the RFID device, the first conductive structure 120 and the second conductive structure 130 are stretched and pulled apart as the garment is worn which will, in turn, move the RFID device to the second operating condition 100B. Further, the presence of the dielectric associated with a person will reduce the operating frequency of the RFID device 100, as illustrated in FIG. 4B, from the optimum when the RFID device is in the first operating condition 100A. However, the RFID device in the second operating condition 100B has an effectively shorter overall antenna structure which is better suited to operating when in the vicinity of a person. As mentioned previously, the change from functioning in the first operating state to functioning in the second operating state may occur in response to a single event. In this example, if the wire of the second conductive structure 130 is bonded mechanically to the printed ink of the first conductive structure 120, the ink may be ripped and distorted by the stretching event of the garment leading to an irreversible change in operating performance of the RFID device 100. Alternatively, the wire of the second conductive structure 130 may be free to slide over the printed ink of the first conductive structure 120, thereby making the process reversible.

Figure 8:
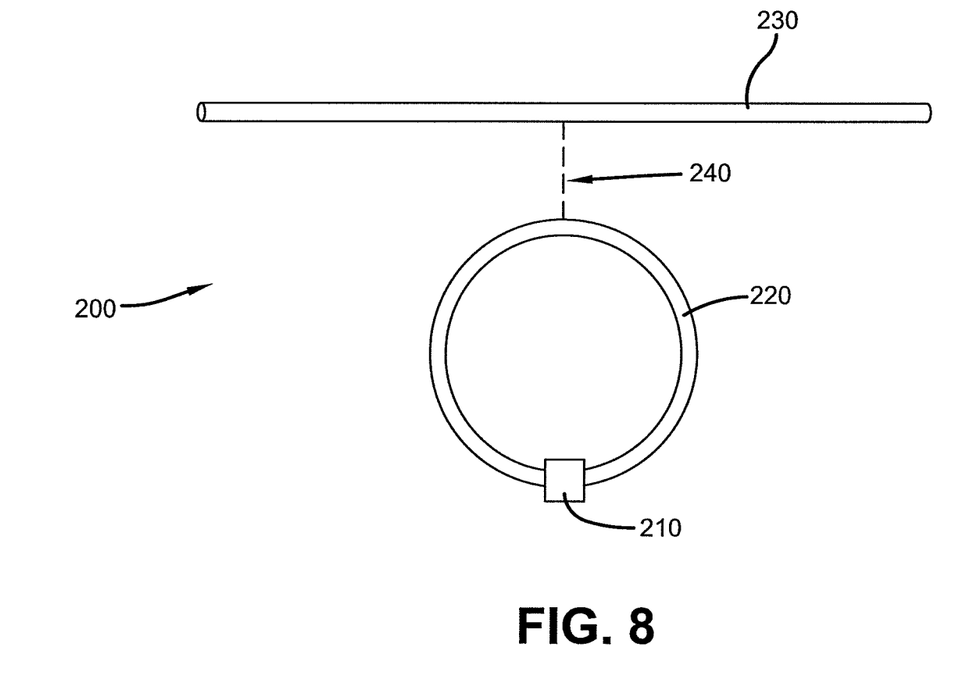
FIG. 8 illustrates a schematic diagram of a RFID device containing a first conductive structure constructed from a first conductive material, a RFID chip, and a second conductive structure constructed from a second conductive material in accordance with the disclosed architecture.
Figure 9A:
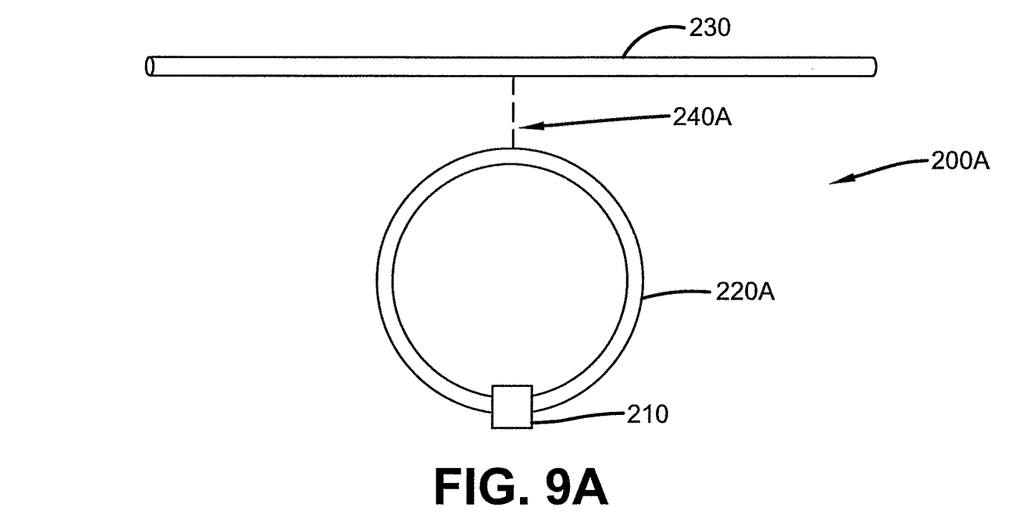
FIG. 9A illustrates a schematic diagram of the RFID device containing the first conductive structure constructed in a substantially circular configuration in a first operating condition in accordance with the disclosed architecture.
Figure 9B:
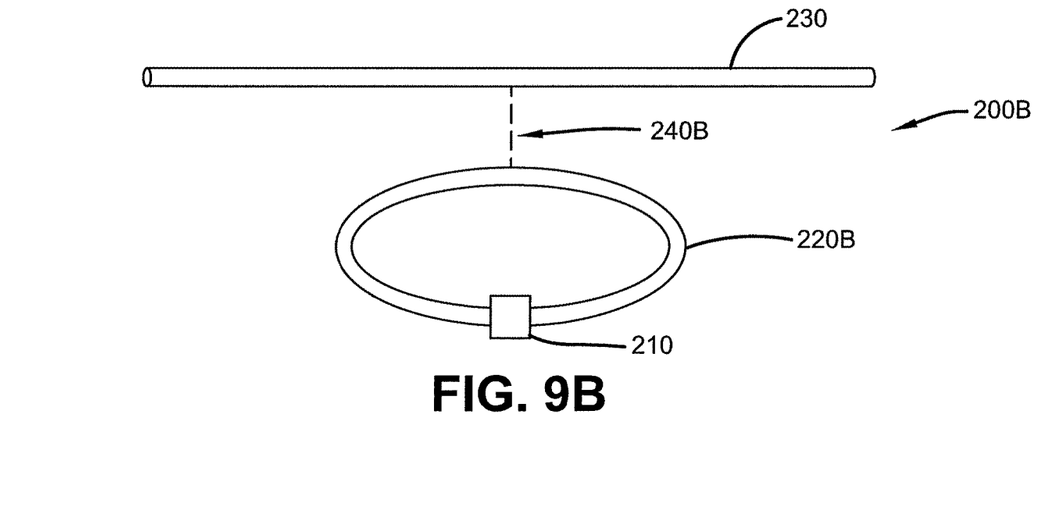
FIG. 9B illustrates a schematic diagram of the RFID device wherein the first conductive structure is deformed in response to an external event (or some other stimuli), causing the RFID device to operate in a second operating condition in accordance with the disclosed architecture.

FIGS. 8-9B illustrates a schematic diagram of an alternative embodiment of the RFID device 200 containing a RFID chip 210, a first conductive structure 220, and a second conductive structure 230. More specifically, RFID device 200 utilizes two separate antenna elements manufactured from different materials that couple via magnetic, capacitive, or a combination of fields. The second conductive structure 230 is operatively coupled to the first conductive structure 220 when the RFID device 200 is in a first operating condition, as best illustrated in FIG. 9A, and the initial coupling between the first conductive structure 220 and the second conductive structure 230 is typically a non-mechanical coupling 240 such as, a magnetic, a capacitive, or a combination of fields. The RFID chip 210 is also operatively coupled to the first conductive structure 220 and/or the second conductive structure 230, and the first and second conductive structures 220 and 230 are typically disposed on a substrate, such as a fabric used for a garment.

As previously stated, the first conductive structure 220 is typically manufactured from a first conductive material, and the second conductive structure 230 is manufactured from a different conductive material. Additionally, the first and second conductive structures 220 and 230 have different configurations having different mechanical properties. For example, the first conductive structure 220 may be a conductive loop that is stretchable, and the second conductive structure 230 may be a wire that is relatively rigid. An external event, such as an applied force like stretching, will alter the coupling 240.

For example, a first conductive structure 220A of the RFID device in the first operating condition 200A in a non-deformed state may be substantially circular in configuration with an initial coupling 240A, as best illustrated in FIG. 9A. In response to the aforementioned stretching event, the first conductive structure 220 may deform, as best illustrated in FIG. 9B. The deformed first conductive structure 220B of the RFID device in the second operating condition 200B may be configured as a deformation of the loop between a circle and an ellipse. The deformation of the first conductive structure 220B creates a modified coupling 240B as the deformed first conductive structure 220B is pulled away from the second conductive structure 230, thereby altering the performance of RFID device 200 as discussed previously.

Figure 10A:
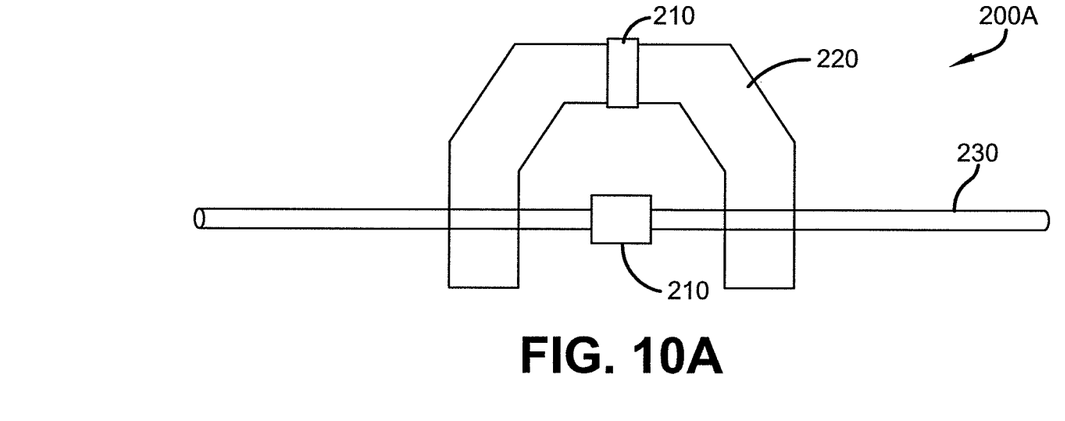
FIG. 10A illustrates a schematic diagram of an alternative embodiment of an RFID device, wherein the first conductive structure partially overlaps the second conductive structure in the first operating condition in accordance with the disclosed architecture.
Figure 10B:
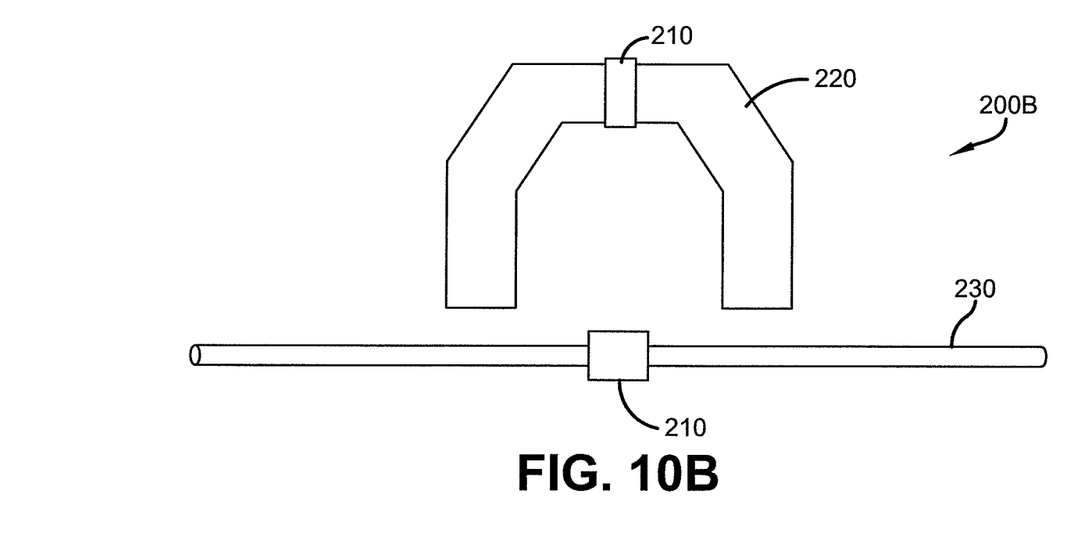
FIG. 10B illustrates a schematic diagram of the alternative embodiment of the RFID device wherein the first conductive structure no longer overlaps the second conductive structure in response to an event causing the RFID device to operate in a second operating condition in accordance with the disclosed architecture.

FIG. 10A illustrates a schematic diagram of an alternative embodiment of an RFID device, wherein the first conductive structure 220 partially overlaps the second conductive structure 230 in the first operating condition 200A, and FIG. 10B illustrates a schematic diagram of the alternative embodiment of the RFID device, wherein the first conductive structure 220 no longer overlaps the second conductive structure 230 in response to an event causing the RFID device to operate in a second operating condition 200B. Each of the first and second conductive structures 220, 230 may further contain a RFID chip 210 operatively coupled thereto. More specifically, the first conductive structure 220 may be configured in a generally U-shape and as a single element, and may contain a bridge where the first conductive structure 220 partially overlaps the second conductive structure 230 in a wire configuration for the RFID device in the first operating condition 220A. In response to an external event, such as tension, the first conductive structure 220 shifts away from the second conductive structure 230, so that the two conductive structures no longer overlap for the RFID device in the second operating condition 220B, thereby reducing the coupling between the first and second conductive structures 220 and 230.

Figure 11:
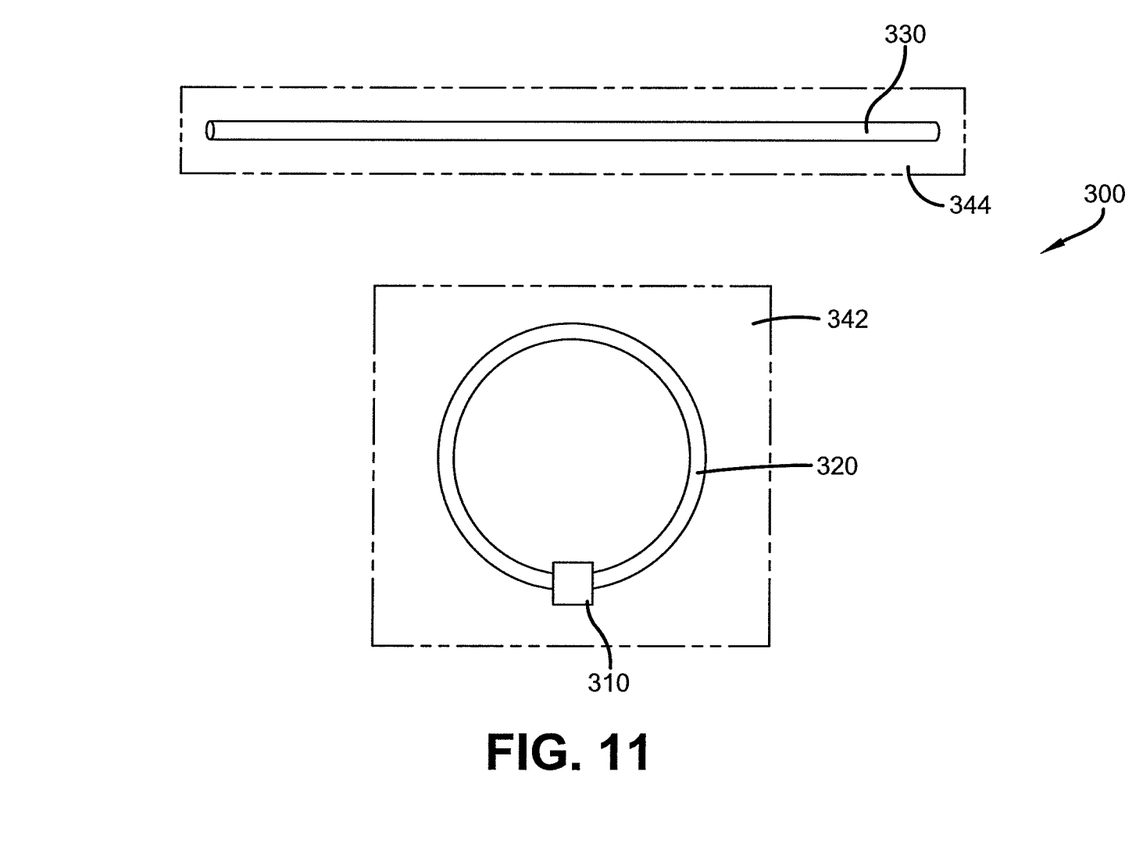
FIG. 11 illustrates a schematic diagram of a RFID device containing a first conductive structure and a second conductive structure constructed from the same conductive material and attached separately to a substrate in accordance with the disclosed architecture.
Figure 12:
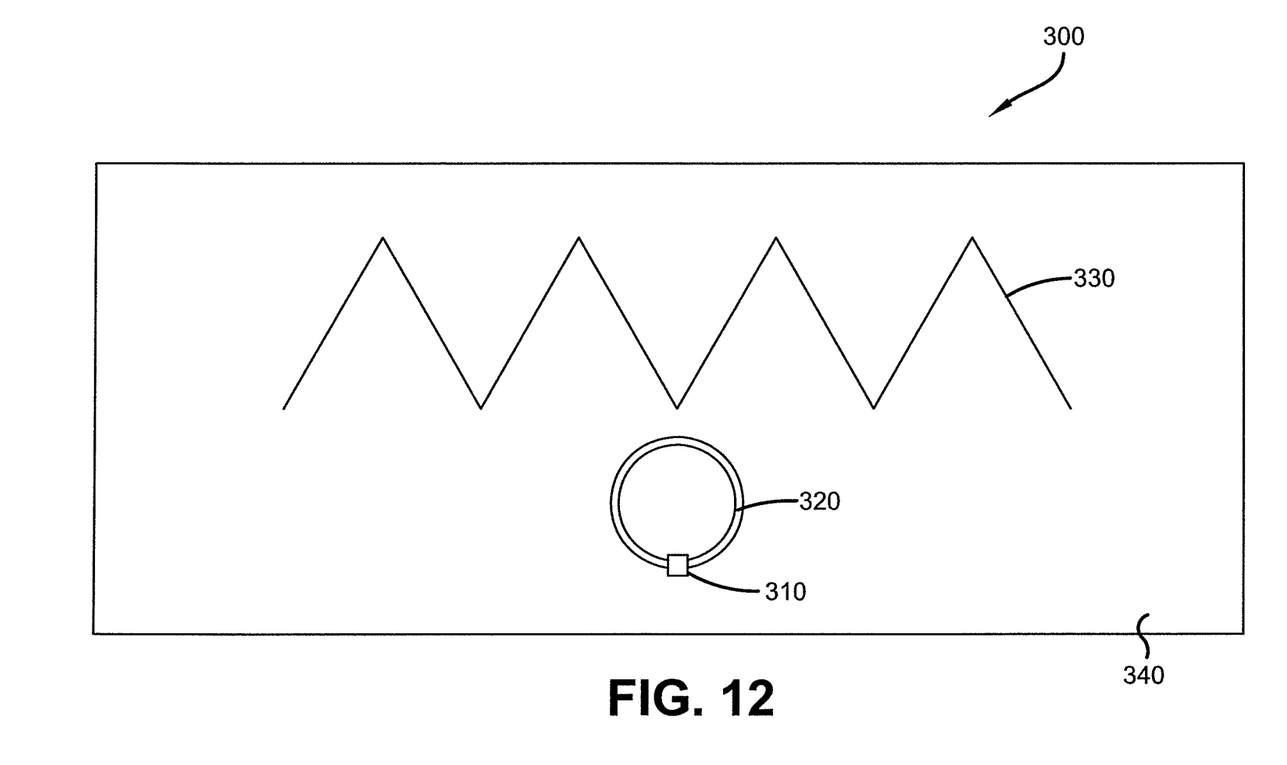
FIG. 12 illustrates a schematic diagram of an alternative embodiment of an RFID device comprising a first conductive structure, an RFID chip, and a second conductive structure, wherein the first and second conductive structures are constructed from the same conductive material and attached separately to the substrate in accordance with the disclosed architecture.

In an alternative embodiment as illustrated in FIGS. 11 and 12, a RFID device 300 utilizes two separate antenna elements manufactured from the same material, but each having different configurations that are encapsulated or attached to a substrate in different ways. More specifically, the RFID device 300 contains a RFID chip 310 operatively coupled to a first conductive structure 320, and a second conductive structure 330 operatively coupled to the first conductive structure 320 when in a first operating condition. The initial coupling between the first conductive structure 320 and the second conductive structure 330 is typically a non-mechanical coupling such as, a magnetic, a capacitive, or a combination of fields. The first and second conductive structures 320 and 330 are separately attached to a substrate 340, such as a fabric used for a garment, so that the first and second conductive structures 320, 330 respond differently to an event.

The first and second conductive structures 320 and 330 in this particular embodiment are typically manufactured from the same conductive material. However, the first and second conductive structures 320 and 330 have different configurations having different mechanical properties. For example, the first conductive structure 320 may be a conductive loop that is movably attached to the substrate 340, and the second conductive structure 330 may be a wire that is relatively rigidly attached to the substrate 340 initially, as best illustrated in FIG. 11. Alternatively, the first conductive structure 320 may be a conductive loop that is non-movably attached to the substrate 340, and the second conductive structure 330 may be a dipole antenna element attached to the substrate 340 in a manner that is relatively free to move, as best illustrated in FIG. 12. An event, such as an applied force like stretching, will alter the coupling between the first and second conductive structures 320 and 330.

As illustrated in FIG. 11, the loop of the first conductive structure 320 may be elastically encapsulated in a first encapsulation portion 342, which is then attachable to the substrate 340. The material of the first encapsulation portion 342 is preferably a stretchable material that when exposed to an event, such as stretching, will permit movement of the first conductive structure 320 on or within the substrate 340. The wire of the second conductive structure 330 is relatively rigidly encapsulated in a second encapsulation portion 344, which is also attachable to the substrate 340. When the RFID device 300 is put under strain, exposed to heat, or some other external event occurs, the loop of the first conductive structure 320 may move relative to the wire of the second conductive structure 330, or distort in shape or position, thereby changing the coupling between the first and second conductive structures 320 and 330 which changes the performance of the RFID device 300 as discussed previously.

As illustrated in FIG. 12, the first and second conductive structures 320 and 330 may be non-encapsulatedly attached to the substrate 340 in a way so that they each respond differently to an external event, such as stretching. For example, the dipole antenna structure of the second conductive structure 330 may be sewn into the fabric of the substrate 340 so that it is relatively free to move when the fabric is stretched. In comparison, the loop antenna of the first conductive structure 320 may be adhesively bonded to the fabric of the substrate 340 so that it does not move unless enough force is applied to non-reversibly detach the first conductive structure 320 from the fabric. As before, the purpose of changes in performance or tuning of the RFID device 300 in response to an event may be retuning of the RFID device 300. Examples of purposes include adapting the RFID device 300 to work better when near a person, the reduction of long range reading to protect consumer privacy while retaining the capability of short-range reading for a user to scan items themselves, or total cessation of operation of the RFID device 300.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A radio-frequency identification (RFID) device comprising:
  a first conductive structure;
  a second conductive structure operatively coupled to the first conductive structure in a first operating condition;
  an RFID chip operatively coupled to the second conductive structure; and
  a substrate;
  wherein the second conductive structure is sewn into the substrate, and the first conductive structure is attached to a surface of the substrate, wherein the first conductive structure comprises a pair of printed areas of conductive ink, and the second conductive structure comprises a wire, and wherein the wire of the second conductive structure is conductively coupled to the pair of printed areas of the first conductive structure by overlapping a part of the pair of printed areas of conductive ink.

2. The RFID device of claim 1, wherein the first conductive structure is manufactured from a first conductive material, and the second conductive structure is manufactured from a different conductive material.

3. The RFID device of claim 1, wherein the first conductive structure has a first configuration, and the second conductive structure has a different configuration.

4. The RFID device of claim 1, wherein the first conductive structure comprises a shunt element.

5. The RFID device of claim 1, wherein exposure to an event causes the RFID device to change from the first operating condition to a second operating condition.

6. The RFID device of claim 5, wherein change from the first operating condition to the second operating condition is reversible.

7. The RFID device of claim 5, wherein change from the first operating condition to the second operating condition is permanent.

8. The RFID device of claim 5, wherein the event comprises at least one of: a washing, a stretching, a heating, or a receiving of an electrical signal.

9. The RFID device of claim 1, wherein a performance level of the RFID device is altered upon removal of the first conductive structure.

10. The RFID device of claim 1, wherein the first conductive structure is water soluble.

11. A radio-frequency identification (RFID) device comprising:
a first conductive structure;
a second conductive structure non-mechanically coupled to the first conductive structure; and
an RFID chip;
wherein the first conductive structure deforms when subjected to an event, wherein deformation of the first conductive structure creates a modified coupling between the first conductive structure and the second conductive structure, and wherein the first conductive structure partially overlaps the second conductive structure.

12. The RFID device of claim 11, wherein the first conductive structure and the second conductive structure have different mechanical properties.

13. The RFID device of claim 11, wherein the first conductive structure is substantially circular in configuration.

14. A radio-frequency identification (RFID) device comprising:
a first conductive structure;
a second conductive structure;
an RFID chip, wherein the first and second conductive structures respond differently to an event; and
a substrate;
wherein the first conductor structure is movably attached to the substrate and that the second conductive substrate is relatively rigidly attached to the substrate.

15. The RFID device of claim 14, wherein the first conductive structure and the second conductive structure are comprised of the same conductive material.

16. The RFID device of claim 14, wherein the first conductive structure is elastically encapsulated in the substrate.

17. The RFID device of claim 14, wherein the second conductive structure is rigidly encapsulated in the substrate.

* * * * *